United States Patent [19]

Periou

[11] Patent Number: 4,872,903
[45] Date of Patent: Oct. 10, 1989

[54] SCREW JACK SAFE AGAINST OVERLOAD FOR A MOVABLE ELEMENT SUCH AS A SEAT STRUCTURE

[75] Inventor: Pierre Periou, Cergy Pontoise, France

[73] Assignee: Rockwell-CIM, France

[21] Appl. No.: 252,216

[22] Filed: Oct. 3, 1988

[30] Foreign Application Priority Data

Oct. 8, 1987 [FR] France .................................. 87 13917

[51] Int. Cl.$^4$ ............................................. F16H 25/24
[52] U.S. Cl. .................................. 74/89.15; 74/424.8 R; 74/459; 254/102; 297/330; 297/472; 411/432
[58] Field of Search ............... 74/89.15, 424.8 R, 459; 297/471, 472, 330; 411/224, 225, 226, 432, 433; 254/102

[56] References Cited

U.S. PATENT DOCUMENTS

| | | | |
|---|---|---|---|
| 2,215,107 | 9/1940 | Mulka | ..................................... 74/459 |
| 3,304,794 | 2/1967 | Bird | .............................. 74/459 X R |
| 3,799,292 | 3/1974 | Katz | ............................... 411/432 X |
| 4,279,329 | 7/1981 | Gehron | ....................... 74/424.8 R X |

Primary Examiner—Allan D. Herrmann

[57] ABSTRACT

The jack (V) comprises a tubular primary screw (10) movable in rotation and translation and provided with an outer screw thread (10a) and an inner screw thread (10b) which have opposite thread hands, a fixed secondary screw (11) engaged in the inner screw thread (10b), a nut (9) connected to the movable element and engaged with the outer screw thread (10a) of the primary screw (10). The nut (9) is composite and comprises a first nut (9a) composed of a plastics material having a good coefficient of friction and a second nut (9b) composed of a mechanically strong material. Axial forces of normal amplitude are absorbed by the plastics nut (9a), while the exceptional overloads, resulting for example from an impact on the front of a vehicle whose seat structure is provided with the jack of the invention, are absorbed by the second nut (9b). In normal operation, the friction between the plastics nut (9a) and the screw (10) are considerably reduced, which provides a jack having an excellent efficiency.

4 Claims, 3 Drawing Sheets

SCREW JACK SAFE AGAINST OVERLOAD FOR A MOVABLE ELEMENT SUCH AS A SEAT STRUCTURE

The present invention relates to a screw jack safe against overload for adjusting a movable element such as for example a motor vehicle seat structure.

There is known from French patent 79 01 741 (publication No: 2 447 494) a device for adjusting the position of a movable element in a vehicle, comprising a tubular primary screw jack whose screw is movable in rotation and in translation and provided with an outer screw thread and an inner screw thread having opposite screw thread hands, a fixed secondary screw engaged in the inner screw thread of the primary screw, and a nut connected to the movable element, said nut being engaged with the outer screw thread of the primary screw.

This telescopic jack provides a large travel for a small volume but has the drawback of resulting in a very high frictional loss percentage (about 50%) between, on one hand, the tubular screw and the fixed screw, and, on the other hand, the tubular screw and the secondary screw.

An object of the invention is therefore to provide a jack of the aforementioned type in which the efficiency is considerably improved by a considerable reduction in the frictional losses and which coserves a sufficient mechanical strength in the event of overload, for example resulting from a violent impact if the movable element associated with this jack is a vehicle seat structure.

According to the invention, the jack is characterized in that the nut is composite and comprises a first nut composed of a plastics material having a good coefficient of friction, and a second nut composed of a mechanically strong material.

Indeed, the use of a suitable plastics material having a good coefficient of friction permits considerably reducing the losses and increasing the efficiency. But the strength of such a plastics material is insufficient when the jack is subjected to very high forces, for example as a result of a collision when the jack is used for the longitudinal adjustment of a vehicle seat structure. The second nut then provides the safety of operation of the device by absorbing this exceptional force.

As an example, the second nut may be made from steel.

According to a feature of the invention, the first nut engages without play on the screw thread of the primary screw and the second nut is provided with a thread defining a clearance with the screw thread of the primary screw. Ths clearance is absorbed when the force exerted on the jack exceeds a maximum value that the primary nut is capable of withstanding without breaking.

Thus, in the event of overload owing to a sudden impact, the first nut yields and the overload is absorbed by the second nut after the clearance between the latter and the screw thread of the first screw is taken up.

Further features and advantages of the invention will be apparent from the following description with reference to the accompanying drawings which illustrate 2 embodiments thereof by way of non-limitative examples.

Figure 1:
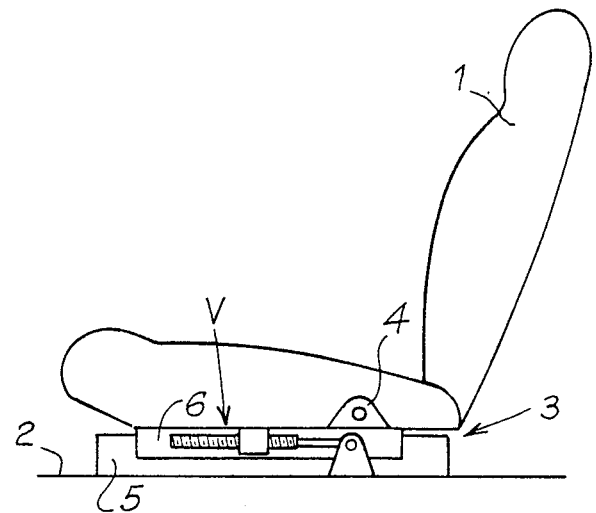
FIG. 1 is a simplified side elevational view of a motor vehicle seat structure provided with a screw jack according to the invention for the longitudinal adjustment of this seat structure.
Figure 2:
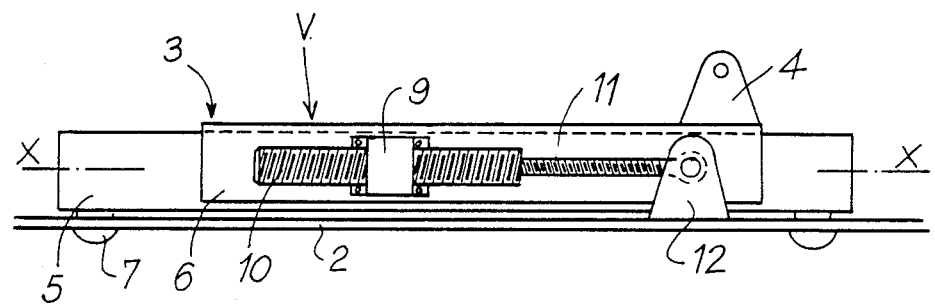
FIG. 2 is a longitudinal elevational view to an enlarged scale of the telescopic jack device having a screw provided on the seat structure of FIG. 1.
Figure 4:
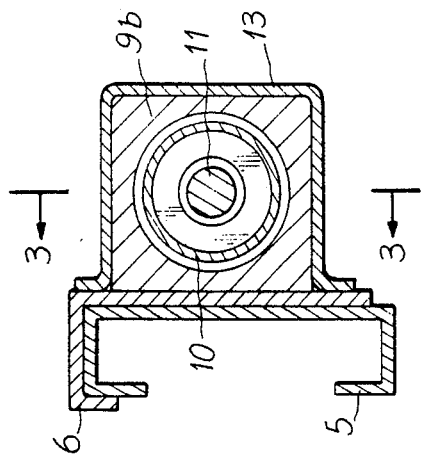
FIG. 4 is a cross-sectional view of the screw jack of line 4—4 of FIG. 3.
Figure 3:
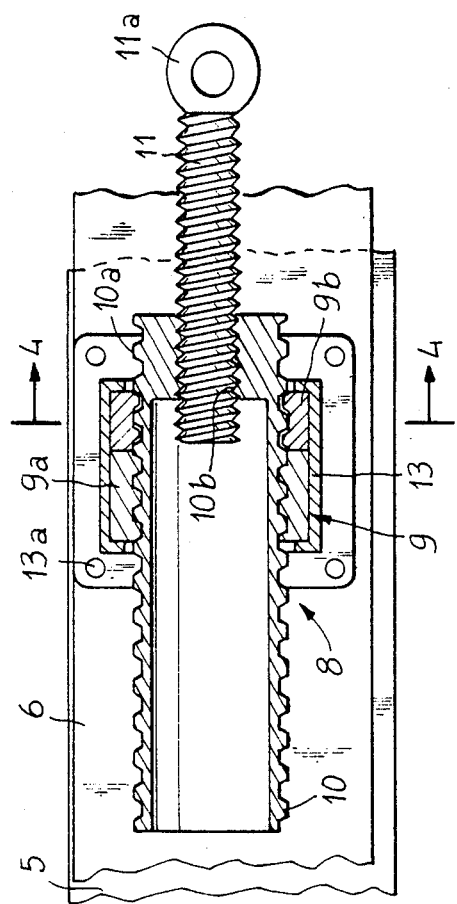
FIG. 3 is an axial sectional view of a first embodiment of the screw jack according to the invention taken on line 3—3 of FIG. 4.

FIG. 1 shows a seat structure 1 for example of a motor vehicle, mounted on a fixed floor 2 and longitudinally movable on the latter by means of a set 3 of slideways. The set 3 comprises a slide 6 connected to the seat structure and carrying a safety belt attachment 4 (not shown) and a slideway 5 fixed to the floor 2 by screws 7 and on which the slide 6 is longitudinally movable at the same time as the seat structure 1 for adjusting the position of the latter.

The slide 6 is provided with a telescopic jack V safe against overload and permitting the adjustment of the longitudinal position of the seat structure 1. The jack V is described hereinafter with reference more particularly to FIGS. 2 to 5.

This jack V comprises a tubular primary screw 10 which is drivable in rotatin and in translation by means known per se and not shown, such as those described in the aforementioned French patent, and are preferably provided with a motor. The primary screw 10 is provided with an outer screw thread 10a and an inner screw thread 10b the hands of which threads are opposite, the inner screw thread 1b being formed only on a part of the length of the screw 10 from one of the ends of the latter.

The jack V further comprises a fixed secondary screw 11 engaged in the inner screw thread 10b with which it is engaged and whose end 10a is pivoted to a bracket 12 fixed to the floor 2 of the vehicle. The jack V also comprises a nut 9 which is engaged with the outer screw thread 10a of the primary screw 10. The nut 9 is located within a cage 13 fixed to the slide 6 by any suitable means, for example by spotwelds 13a.

The nut 9 is composite and comprises a first nut 9a made from a plastics material having a good coefficient of friction, such as for example a polyacetal, an a second nut 9b formed by a material which is mechanically much stronger than the plastics of the nut 9a, for example steel.

As a numerical example, the material from which the nut 9a is made is so chosen that the latter is capable of withstanding usual axial forces of about 100 daN, while the material of the nut 9b is so chosen that the latter is capable of withstanding without breaking exceptional axial forces which may be as much as 2000 daN.

The screws 10 and 11 and the nut 9 have a common axis X parallel to the slide 6.

The two nuts 9a and 9b are placed side by side in the cage 13, the nut 9b being placed at one or the other side of the latter.

The nut 9a is constructed with a screw thread which engages without clearance on the screw thread 10a of the screw 10 while the second nut 9b is provided with a screw thread 9c defining a clearance J (FIG. 5) with that of the primary screw 10.

Advantageously, the clearance J comprises the clearances J1 and J2 so as to ensure the same properties in both directions of operation.

The technical effect of the screw jack just described is the following.

In normal operation, i.e. when the movable element whose position must be adjusted by the jack V, for example a seat structure 1 of a motor vehicle, is only subjected to axial forces of normal amplitude, these forces are absorbed by the nut 9a whose friction on the primary screw 10 is very low, which provides the jack with an excellent efficiency. On the other hand, in the event of an exceptional axial overload, for example resulting from a collision of the vehicle provided with the seat structure 1, the plastics nut 9a yields and the nut 9b takes over after the clearance J1 or J2 has been taken up. The screw thread 9c of the nut 9b then cooperates with the screw thread 10a so that the nut 9b, which is maintained by the cage 13 rigid with the slide 6, resists this sudden overload and prevents the seat structure 1 from being wrenched away from the screws 10 and 11, so that the desired safety is ensured in such a case.

Figure 7:
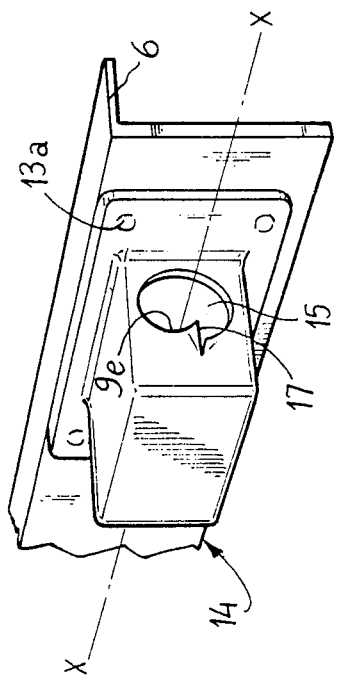
FIG. 7 is a perspective view of the nut of the screw jack of FIG. 6.
Figure 5:
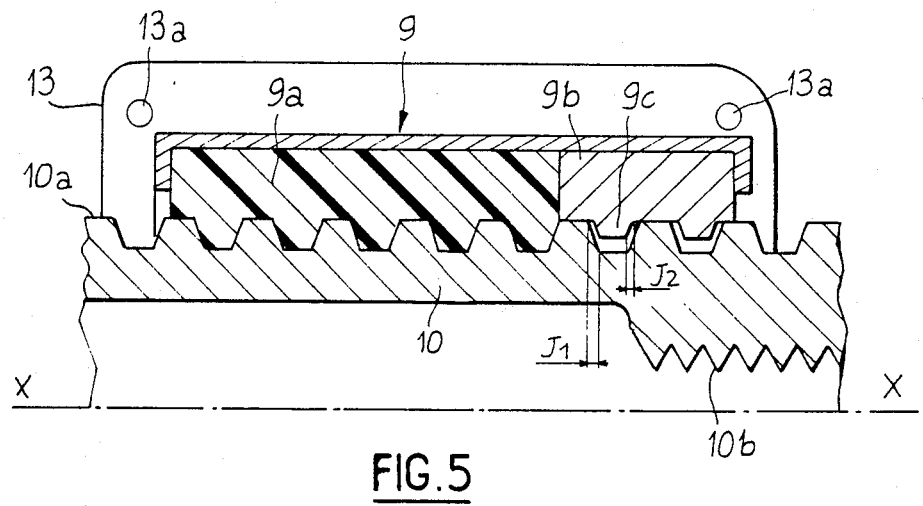
FIG. 5 is a partial axial sectional view to an enlarged scale of the screw jack of FIGS. 3 and 4 in the region of the composite nut thereof.
Figure 6:
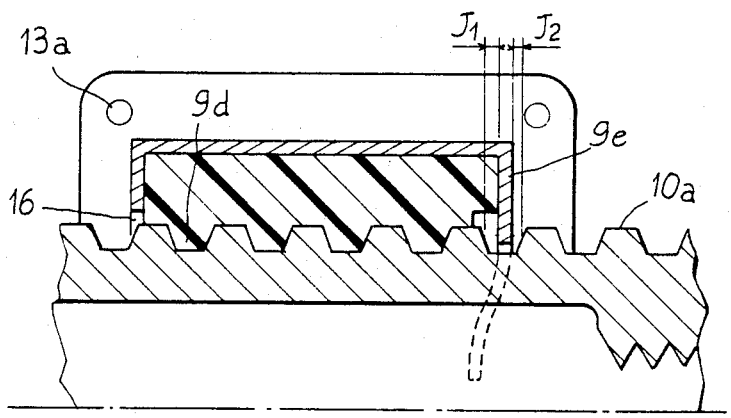
FIG. 6 is a partial axial sectional view similar to FIG. 5, of a second embodiment of the screw jack according to the invention.

The second embodiment of the screw jack according to the invention, illustrated in FIGS. 6 and 7, differs from the preceeding screw jack mainly by the fact that the second resisting nut is here an intergral part of the cage containing the first nut.

Indeed, in this embodiment, the nut 9d composed of plastics material is contained in a cage 14 having two opposite openings 15 and 16, and the primary screw 10 extends through the opening 15 which is defined by a periphery 9e in the form of a screw thread. This screw thread 9e has a projecting end portion 17 which is axially offset by one pitch relative to the diametrically opposed portion of the screw thread, the thickness of the screw thread of the periphery 9e defining the clearances J1 and J2.

In the event of an exceptional overload exerted axially on the jack, this overload is absorbed by the screw thread 9e which constitutes a safety nut and after the clearance J1 or J2 has been taken up.

The scope of the invention is not intended to be limited to the two embodiment described hereinbefore and may encompass modifications within the scope of the accompanying claims. Furthermore, the screw jack according to the invention is capable of being used in many applications apart from that described hereinbefore for a motor vehicle seat structure, it being possible to equip any movable element which might receive exceptional overloads with this jack.

I claim:

1. A screw jack safe against overload for a movable element such as a seat structure, said screw jack comprising a support, a tubular primary screw movable in rotation and in translation and provided with an outer screw thread and an inner screw thread which screw threads have opposite screw thread hands, a fixed secondary screw fixed relative to the support and engaged in the inner screw thread of the primary screw, nut means for connection to said movable element, said nut means being engaged with the outer screw thread of the primary screw, the nut means being composite and comprising a first nut composed of a plastics material which has a good coefficient of friction, and a second nut which is composed of a mechanically strong material.

2. A jack according to claim 1, wherein the first nut engages without clearance on the screw thread of the primary screw and the second nut has a screw thread which defines a clearance with the screw thread of the primary screw, whereby said clearance is taken up when a force exerted on the jack exceeds a maximum value that the first nut is capable of withstanding without breaking.

3. A jack according to claim 1, comprising a cage for connection to said movable element, in which cage the first nut and second nut are disposed.

4. A jack according to claim 1, comprising a cage for connection to said movable element, with which cage the second nut is an integral part, the cage containing the first nut and defining an opening through which opening the primary screw extends, said second nut being formed by a screw thread provided on the periphery of said opening.

* * * * *